United States Patent Office.

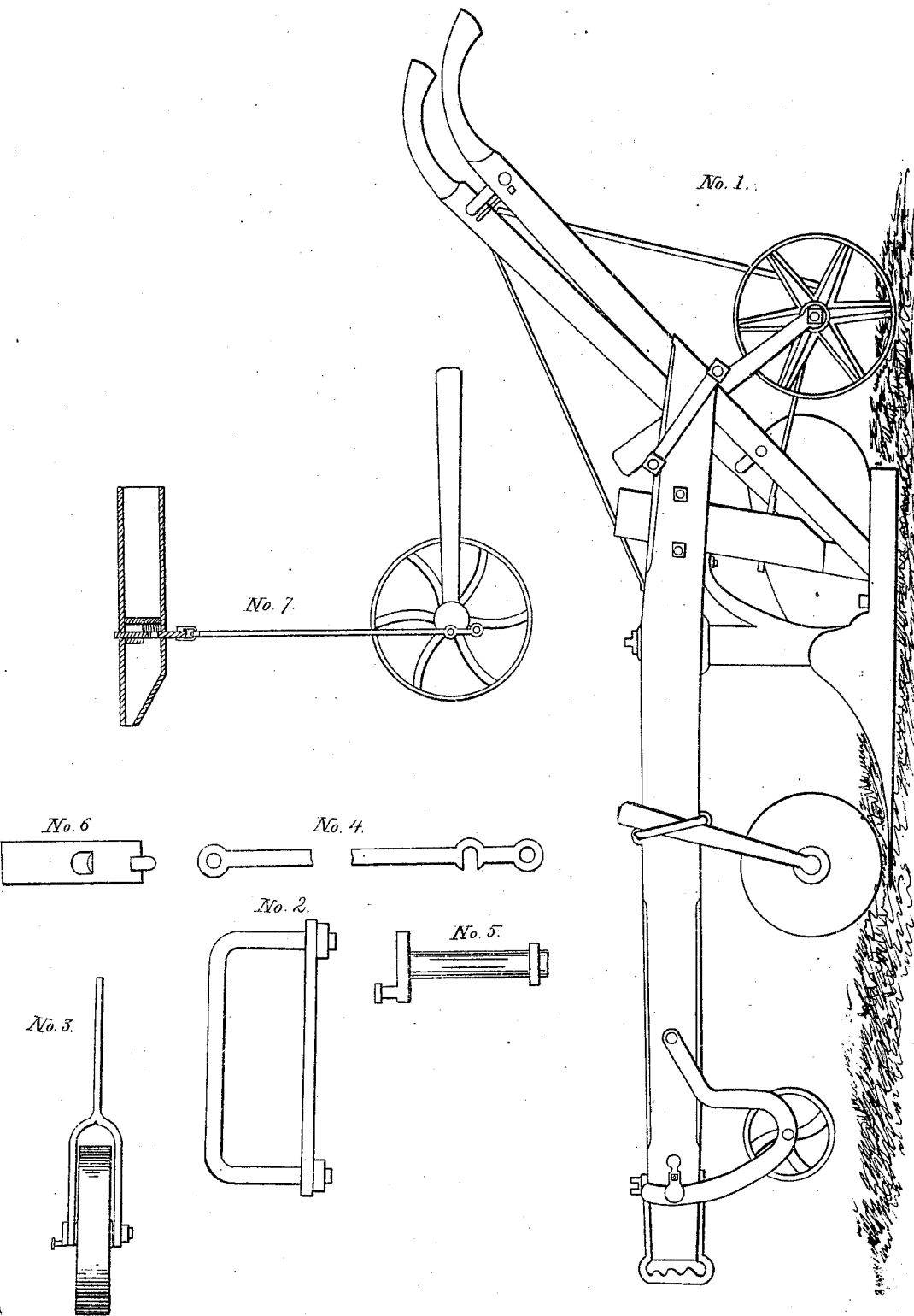

PATRICK McISAAC, OF WATERLOO, IOWA.

Letters Patent No. 73,022, dated January 7, 1868.

IMPROVEMENT IN CORN-PLANTER AND PLOUGH COMBINED.

The Schedule referred to in these Letters Patent and making part of the same.

Be it known that I, PATRICK McISAAC, of Waterloo, county of Black Hawk, and State of Iowa, have invented a new and useful Improvement for the Purpose of Attaching a Box Corn-Planter to a Breaking or other Plough for the Purpose of Planting Corn; and I do declare that the following is a full, clear, and exact description of the construction and operation of the same, reference being had to the annexed drawings, making a part of this specification, in which—

Figure 1 is a view as attached to the plough ready for work.

No. 2, clip for fastening No. 3 to beam of plough.

No. 3, wheel and guide.

No, 4, connecting-rod attached to slide in box or hopper and pin on No. 3.

No. 5, crank attached to No. 3.

No. 6, slide and slot in same.

No. 7, hopper or box.

The nature of my improvement or invention consists in attaching, by the above machinery, an ordinary corn-planter to any ordinary plough, and at the same time of ploughing the land, dropping and covering the corn.

To enable others skilled to make and use my invention, I will proceed to describe its construction and operation.

I take any ordinary hand corn-planter, leaving off the handle, and have the slide with the slot No. 6 run transverse through the wooden or metal box No. 7, and attach this planter to the beam of the plough, about half way between the standard of the plough and the back end of the beam, by means of an iron, B, and I then attach the guide No. 3 to the beam of the plough, as seen in No. 1, by means of an iron fastening, No. 2. The wheel and guide are seen in No. 3. On the inside of the guide No. 3, and attached to the pin No. 5, which is made fast in the wheel, is a small iron head, to one side of which is a pin. On this pin the connecting-rod No. 4 is attached by an open slot, in order that it may be raised off when it is not desired to drop the grain. The connecting-rod No. 4 is attached to the slide in the planter No. 6 by a joint. The lower end of the box or planter is placed so that the corn will drop one or two inches from the land-side of the plough. The wheel serves the double purpose of drawing the slide to drop the corn and covering the same by rolling the furrow over and on to the grain. The distance apart from hill to hill is regulated by the size of the wheel No. 3, and after planting one row, by raising the connecting-rod from the pin No. 3, and letting it remain off until a sufficient distance is gained to commence planting again. The attachment can be attached to a breaking-plough or to any ordinary plough.

What I claim as my invention, and desire to secure by Letters Patent, is—

The herein-described arrangement of the several parts constituting the corn-planter, and the mode herein described of attaching the same to a common plough, as specified.

PATRICK McISAAC.

Witnesses:
J. C. MILLER,
J. R. MOODY.